Jan. 18, 1938.   N. CHAMPION   2,105,521
PHOTOGRAPH IDENTIFICATION
Filed May 18, 1937   2 Sheets-Sheet 1
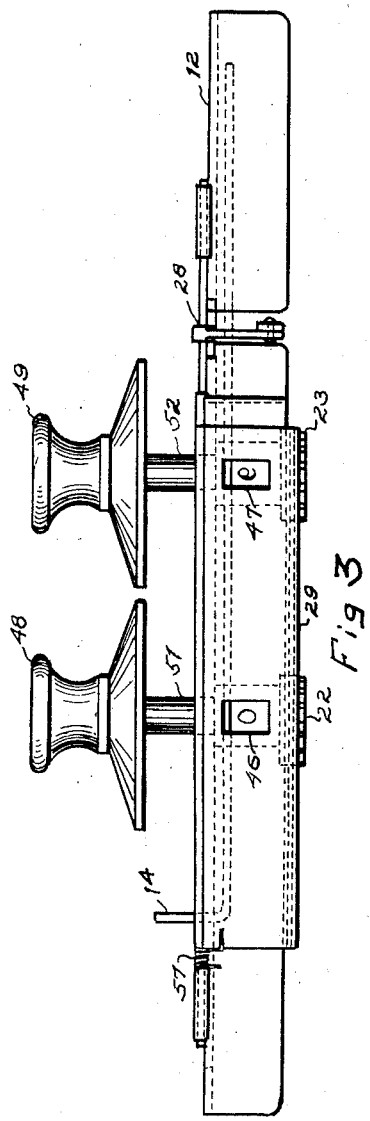
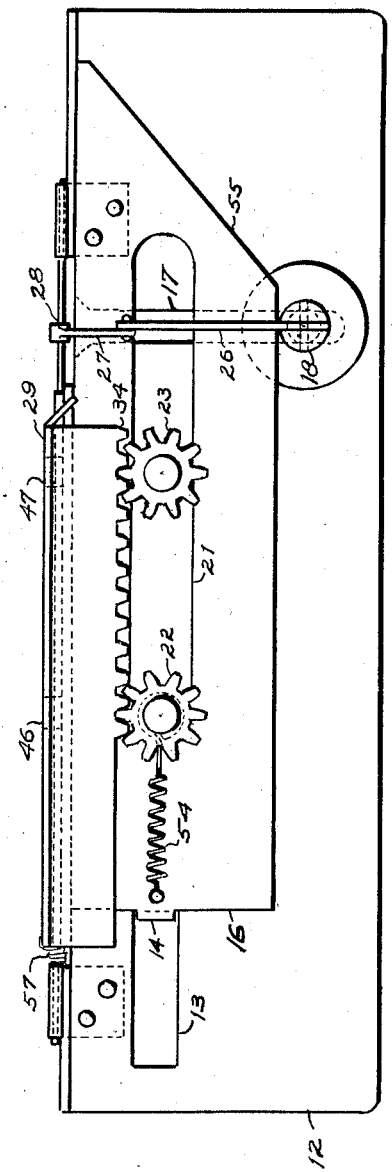
INVENTOR.
Necols Champion
BY
ATTORNEYS.

Jan. 18, 1938.  N. CHAMPION  2,105,521
PHOTOGRAPH IDENTIFICATION
Filed May 18, 1937  2 Sheets-Sheet 2
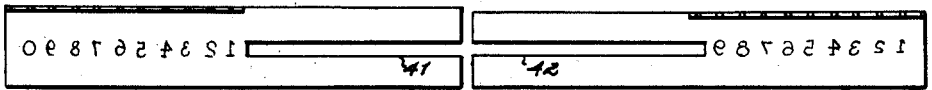
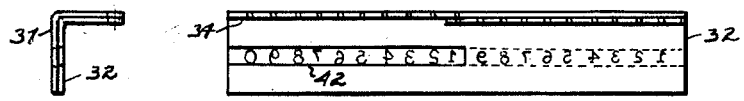
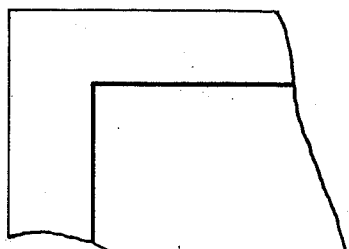
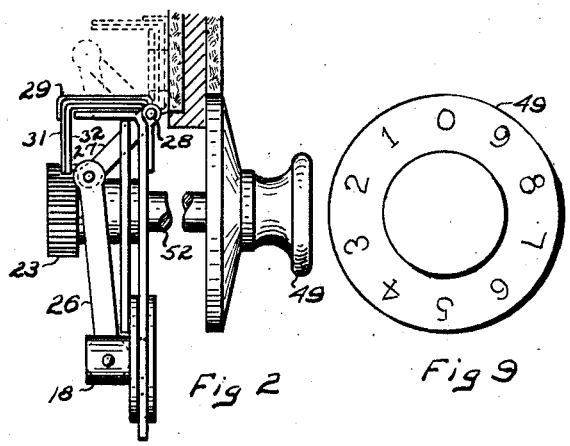
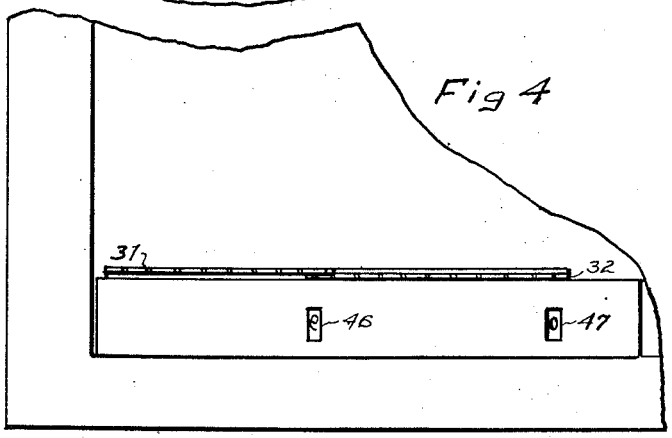
INVENTOR.
Necols Champion
BY
ATTORNEYS.

Patented Jan. 18, 1938

2,105,521

UNITED STATES PATENT OFFICE 2,105,521

PHOTOGRAPH IDENTIFICATION

Necols Champion, Orange, N. J.

Application May 18, 1937, Serial No. 143,397

5 Claims. (Cl. 95—1.1)

This invention relates to photography and particularly to the identification of photographs.

An object of the invention is to produce a system of identifying photographs, said system involving the concept of photographically registering an identifying mark upon the exposed film or plate itself by an action which occurs automatically and simultaneously with the act of inserting or removing the said film or plate from the image receiving position in the camera—thereby eliminating all those steps that are involved in the separate marking operation, whether by printing or photographic methods, heretofore employed.

Another object of the invention is to provide, in conjunction with the photographic registering means above referred to, novel means for indexing said registering means by remote control coordinated with the registering means in such a manner as to insure a distinctive designation for each new film or plate, yet without any handling of the film or plate itself, other than that involved in the normal routine of inserting it in the camera, prior to exposure to the object to be photographed, and subsequently withdrawing it from the camera. Moreover, the remote control is such as to permit the indexing of the identifying characters to be accomplished at the most convenient time and place, namely, in the office or studio, rather than in the film developing, or "dark" room, and even before any adjustment or "loading" of the camera.

These and other objects and features of the invention will become apparent as a study is made of the following specification and the accompanying drawings representing the preferred embodiment of the invention: although for an indication of the scope of permissible variations in structure and operation, reference is to be made to the appended claims.

In the drawings:

Fig. 1 is a side elevation of a device embodying the invention;

Fig. 2 is an end view of the mechanism shown in Fig. 1;

Fig. 3 is a plan view of the structure shown in Fig. 1;

Fig. 4 is a view of a portion of a conventional negative frame of "plate holder" of the slide type employed in one form of camera, and showing the sensitized glass plate or film, mounted therein, on which an identifying number "90" has already been imprinted by the action thereupon of the numbering mechanism shown in Figs. 1, 2 and 3;

Figs. 5 and 6 are elevational views of the stencil plates shown in the assemblies of Figs. -, 2 and 3;

Fig. 7 is an end view of the stencil plates shown in Figs. 5 and 6;

Fig. 8 is a view of the stencils as they appear when telescoped inwardly by the action of the indexing mechanism of Figs. 1, 2 and 3, to the limits of their movements in one direction (Figs. 5 and 6 representing the opposite limits); and Fig. 9 is a diagrammatic view of the face of one of the two dials shown in Fig. 3, the other (or others, when more than two are employed, as where registrations higher than "99" are desired) being similarly marked.

Referring first to Figs. 1, 2 and 3, reference character 12 designates a mounting bracket or apron serving as a base for attachment of the entire assembly to the camera (not shown), said base 12 having a longitudinal slot 13 therein to allow for rectilinear movement of an arm 14 which projects transversely from one end of slide cam 16, and a second slot 17 along which the cross head 18 of a hinged gate operating linkage is adapted to move whenever slide cam 16 is shifted to the left of the position shown in Fig. 1. The slide cam 16 is also slotted, as shown at 21, to allow for a full stroke thereof without interference from the stencil rack actuating pinions 22 and 23, which rotate about fixed axes, as hereinafter described.

The hinged gate operating linkage includes, in addition to the cross-head 18, a pair of links 26 and 27 pivotally connected to the hinge or rockshaft 28 of the gate element 29 which houses the two stencil plates 31 and 32. As indicated in Fig. 7, each stencil plate is L-shaped, with one leg of each stencil plate slidable between the two retaining walls of the gate 29, while the other leg of each stencil plate has a gear toothed edge 34 adapted to mesh with one of the pinions 22 or 23, as the case may be, and the two plates 31 and 32 being of such dimensions that the latter will "nest" within the former when in close formation as indicated in Fig. 8. Also, each plate is recessed, as indicated at 41 and 42, so that the number-forming openings in each remain unobscured by those of the other, in whatever relative positions they may assume.

In order to allow light to pass through only the selected digit of each stencil plate, when the retaining gate 29 is tilted back against the face of the film, or "negative", as indicated in dash lines in Fig. 2, the said gate 29 has only a single opening, or "window" therein, for each of the stencil combinations, or in other words, as shown—there being only two series of digits—there are but two windows (46 and 47) in the said gate 29. Each window is adapted to register with the digits of its corresponding series in sequence, as determined by the rotation of actuating pinion, 22 or 23 as the case may be, and each pinion is of course actuated by its corresponding dial knob, 48 or 49, the said dial knobs being on the outer ends of the pinion shafts 51 and 52, respectively, so as to be readily manipulable from outside the camera housing, prior to inserting of the negative carrying holder shown in Fig. 4. When, however, this negative carrying holder is inserted, it strikes against the projecting arm 14 and moves it inwardly along slot 13, against the resisting tension of spring 54 (anchored at one end to apron 12 and at the other end to slide-cam 16). The resulting withdrawal of cam edge 55 (of cam 16) from the path of cross-head 18 allows the gate 29 to swing from the full to the dash line position of Fig. 3 the swinging being assisted by the action of torsion spring 57 (Figs. 1 and 2) upon hinge 28, and the links and cross-head 18 being thereby constrained to follow along in the guideway 17 which is now unobstructed by virtue of the withdrawal of the cam surface 55. Light will now pass (from an external source, not shown) through windows 46 and 47 of the gate 29, and through the particular digit forming cut-outs of the stencil plates that are then in registry with said windows. Thus the face of the sensitive negative becomes (by restricted exposure) permanently marked for identification, while the negative is still in the "picture taking" position within the camera, and without any intervention whatever by the camera operator (except that required to turn the dial knobs to the position corresponding to the number to be registered upon the negative—and this dial turning, as above pointed out, precedes the actual insertion of the negative).

When the picture has been "taken", the withdrawal of the negative from the camera will automatically cause spring 54 to return the slide cam 16 to the position shown in Fig. 1, and the return movement of the cam edge 55 will shift cross-head 18, and hence the gate 29, back to the full line positions indicated in Figs. 1 and 2. The device is now ready for a re-indexing of the stencils by means of turning the dial knobs to a new setting, to produce a new and distinctive marking upon the next negative to be inserted in the camera.

I claim:

1. A camera attachment comprising, in combination with the camera chamber which receives the sensitized film or plate and its holder, an apertured element normally out of the path of said film or plate, a member projecting toward said path, means for moving said members along said chamber in response to the insertion of the plate holder, means responsive to said movement to shift said apertured element into contact with the surface of said film or plate, means for causing a pre-selected identifying character to register with an aperture in said element whereby, upon exposure, light will pass to said film or plate by way of said identifying character and aperture, to cause said identifying character to be photographically registered on said film or plate, a stencil composed of a series of said identifying characters, means operative upon withdrawal of the film or plate holder to remove said apertured element from the path of said holder, an indexing member, and means for connecting said indexing member to said stencil to provide for shifting of the latter in relation to said apertured element.

2. A camera attachment comprising, in combination with a camera chamber which receives the sensitized film or plate, an apertured element normally out of the path of said film or plate, a member projecting toward said path, means for moving said member along said chamber in response to the insertion of the film or plate, means responsive to said movement to shift said apertured element into contact with the surface of said film or plate, means including a stencil for causing a preselected identifying character to register with an aperture in said apertured element, said stencil having a series of identifying characters formed therein, an indexing member, and means for connecting said indexing member to said stencil to provide for shifting of the latter in relation to said apertured element.

3. A camera attachment comprising, in combination, a plate receiving chamber, an apertured element therein, means responsive to insertion of the plate to shift said apertured element into contact with the surface of said plate, means including a stencil for causing a pre-selected identifying character to register with an aperture in said apertured element, said stencil having a series of identifying characters formed therein, an indexing member, and means for connecting said indexing member to said stencil to provide for placing said stencil in position to apply a new identifying character to the succeeding plate inserted in said chamber.

4. A camera attachment comprising, in combination, a plate receiving chamber, an apertured element therein, means responsive to insertion of the plate to shift said apertured element into contact with the surface of said plate, means including a stencil for causing a pre-selected identifying character to register with an aperture in said apertured element, said stencil having a series of identifying characters formed therein, an indexing member, means for connecting said indexing member to said stencil to provide for placing said stencil in position to apply a new identifying character to the succeeding plate, and means for transmitting the movement of said indexing member to said stencil.

5. A camera attachment comprising, in combination, a film receiving chamber, an apertured element therein, means responsive to insertion of the film to shift said apertured element into contact with the surface of said film, means including a stencil for causing a pre-selected identifying character to register with an aperture in said apertured element, said stencil having a series of identifying characters formed therein, an indexing member, means for connecting said indexing member to said stencil to provide for shifting the latter in relation to said apertured element, and means for transmitting the movement of said indexing member to said stencil.

NECOLS CHAMPION.